United States Patent [19]
Lynch et al.

[11] Patent Number: 5,862,506
[45] Date of Patent: Jan. 19, 1999

[54] MODIFIED TRIMMED MEAN FILTERING FOR MISFIRE DETECTION

[75] Inventors: Marvin L. Lynch, Detroit; Michael A. McClish, Northville; Margaret A.. Selfe, Farmington Hills; Gregory Steinl, Royal Oak, all of Mich.

[73] Assignee: Motorola Inc., Schaumburg, Ill.

[21] Appl. No.: 690,464

[22] Filed: Jul. 29, 1996

[51] Int. Cl.⁶ .......................... G01M 15/00; G06F 19/00
[52] U.S. Cl. .......................... 701/111; 701/101; 701/110; 73/117.3
[58] Field of Search .................. 364/431.03, 431.04, 364/431.07, 431.08, 551.01; 73/116, 117.3, 112; 123/419, 436; 701/101, 102, 110, 111

[56] References Cited

U.S. PATENT DOCUMENTS

| | | | |
|---|---|---|---|
| 5,095,742 | 3/1992 | James et al. | 73/116 |
| 5,305,635 | 4/1994 | James et al. | 123/419 |
| 5,379,634 | 1/1995 | Kuroda et al. | 73/116 |
| 5,508,927 | 4/1996 | Remboski, Jr. et al. | 364/431.08 |
| 5,515,720 | 5/1996 | Remboski, Jr. et al. | 364/431.07 |
| 5,542,291 | 8/1996 | James | 364/431.08 |
| 5,559,705 | 9/1996 | McClish et al. | 73/117.3 |
| 5,616,834 | 4/1997 | Lynch et al. | 73/115 |

OTHER PUBLICATIONS

"Generalized Median Filtering and Related Nonlinear Filtering Techniques" by Young Hoon Lee and Saleem A. Kassam, IEEE Transactions on Acoustics, Speech and Signal Processing, vol. ASSP 33, No. 3, Jun. 1985.

*Primary Examiner*—Tan Q. Nguyen
*Attorney, Agent, or Firm*—Nicholas C. Hopman

[57] ABSTRACT

A modified trimmed mean filtering method and apparatus for a misfire detection includes acquiring a time-continuous series of acceleration data samples (601) representative of acceleration behavior of a reciprocating engine. And, providing a filtered acceleration data sample (607) dependent on an average acceleration magnitude of a portion of the acceleration data samples bounded within a range of amplitudes and, preferably, a time-centered acceleration data sample (606) of the fixed length time-continuous series of acceleration data samples. A misfire condition can be indicated (409) dependent on a magnitude of the filtered acceleration data sample.

16 Claims, 8 Drawing Sheets

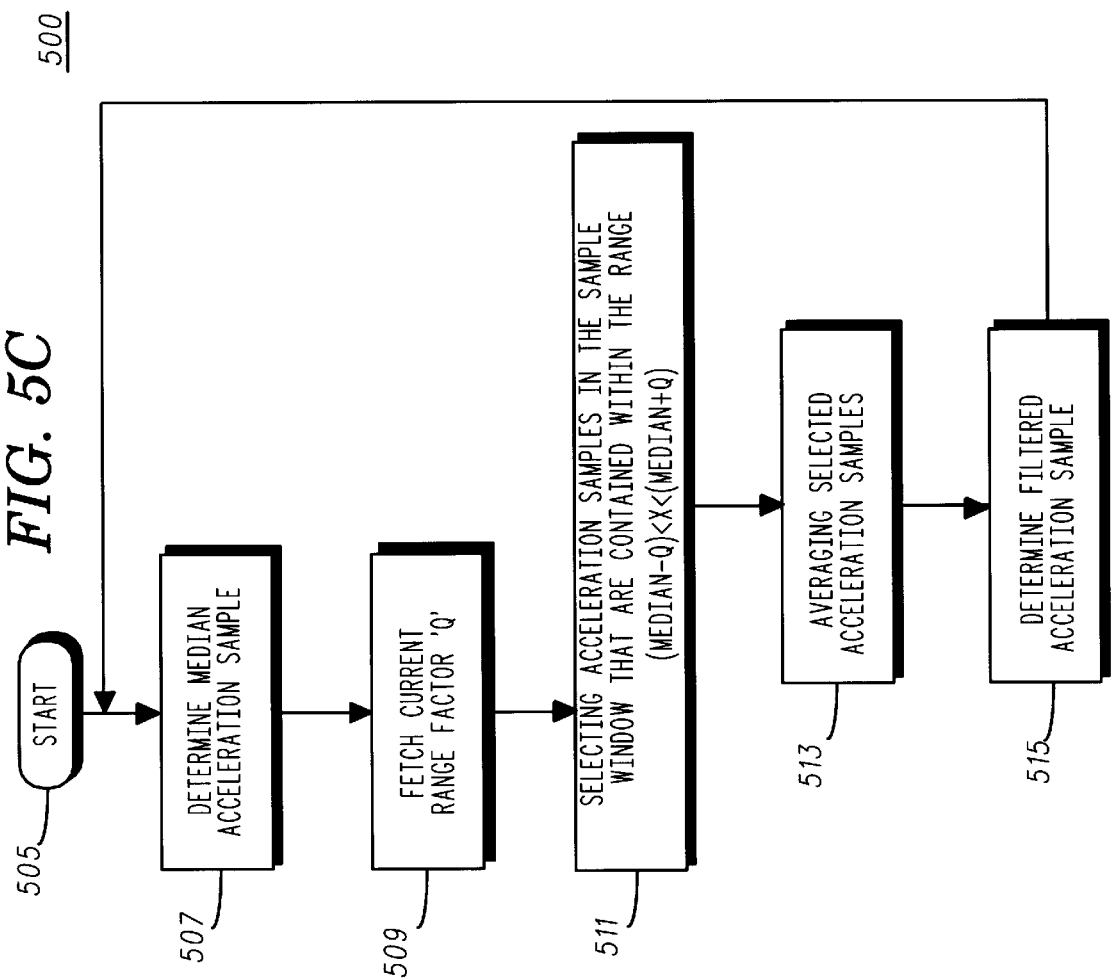
FIG. 5C
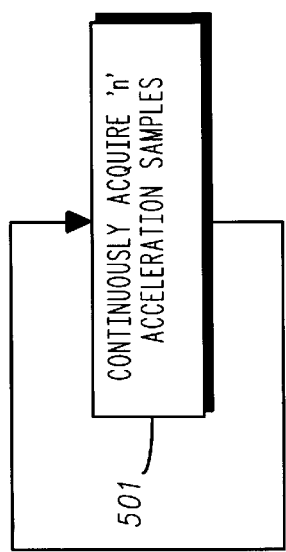
FIG. 5A
FIG. 5B

MODIFIED TRIMMED MEAN FILTERING FOR MISFIRE DETECTION

FIELD OF THE INVENTION

This invention is related to the field of misfire detection within a reciprocating engine, and more specifically to a method, and corresponding apparatus for detecting misfire by improving signal fidelity in a misfire detection system.

BACKGROUND OF THE INVENTION

Many contemporary engine controls have integral misfire detection systems. With ever-increasingly more stringent legislated emissions standards, the assurance of accurate and complete misfire detection under all engine and vehicular operating conditions is becoming mandatory.

Commonly, system designers rely on measurement of engine acceleration, dependent largely on engine torque produced (or not produced) during a combustion process to determine misfiring of a particular engine cylinder. Given the acceleration information, misfires are predicted by various signature analysis, and/or spectral analysis, methods.

As a practical matter, an engine's acceleration behavior is also affected by powertrain related behaviors other than firing torque. These other behaviors can significantly reduce fidelity or signal-noise ratio of the primarily firing torque related acceleration signal under analysis. Furthermore, under some engine operating conditions, the noise exceeds the primarily engine torque related acceleration signal under analysis. Moreover, the noise related behavior is not limited to engine operation only causes, but include behaviors related to the complete driveline. Some noise related behaviors that are detrimental include relatively low frequency, or firing rate, driveline resonance effects, or vibrations, excited at least partially by cylinder misfiring, torque converter lockup, low speed lugging behavior characteristic of a manual transmission, a change in transmission gears and rough road conditions. Each of these, and other sources of stimulus, excite the driveline to perturbate, or transiently oscillate, at its resonant frequency.

When the above-mentioned driveline behaviors manifest themselves, and the driveline oscillates, a significant measure of what amounts to noise, relative to the misfire induced behavior, is introduced into the acceleration measurement. This noise can largely swamp out any signatory behavior of a misfire event—particularly with a non-compliant mechanical coupling between the engine and its transmission.

FIG. 1 shows a first portion 101 of a noise-free waveform indicative of an acceleration signal derived from an engine's crankshaft due to a properly firing cylinder, firing in a sequence of several cylinders, and a second portion 103 of the waveform indicative of acceleration of an engine's crankshaft due to a misfiring cylinder later in the sequence of firing cylinders. At reference number 103 the engine's crankshaft grossly decels because proper firing did not occur. Given this observation of acceleration behavior, a magnitude comparison process can monitor the engine's acceleration behavior at a predetermined threshold 105 and indicate a misfiring condition if the acceleration signal transitions below the threshold 105.

FIG. 2 illustrates a behavior of an actual acceleration signal 201 derived from a running engine over about 150 cylinder combustion cycles. This acceleration signal 201 includes a repetitively induced misfire by periodically removing a spark signal from one cylinder. From FIG. 2 it can be seen that in a real-world application, the signal derived from a running engine is effected by causes other than combustion related torque as asserted earlier. For reference purposes, the reference markers associated with the horizontal axis 203 demarcate the repetitively induced occurrences of misfire. The waveform 201 is derived using an acceleration sensing device coupled to the engine's crankshaft. Because of crankshaft torsional vibrations, inertial torque due to reciprocating masses, driveline resonance effects, and other mechanically induced vibrations on the engine's crankshaft, the waveform shown in FIG. 2 has relatively poor fidelity. This makes detection of misfire by a simple threshold detection scheme substantially hopeless.

To address the driveline ringing effects some misfire determination schemes use running average filters and/or median filters to eliminate low frequency behavior—such as driveline vibration behavior in an acceleration signal. Median filter based schemes suffer from a fixed signal-noise ratio and separation factor for any given window size. The signal-noise ratio is defined as a ratio of the peak amplitude of the signal to the peak amplitude of the noise. The separation factor can be expressed as the ratio of the difference of mean normal and misfiring acceleration with respect to the sum of the standard deviations of normal firing and misfiring acceleration. Running average filters are somewhat adequate for smoothing random nonimpulsive perturbations in the incoming signal but tend to smear sharp monotonic edge transitions that occur due to driveline inputs, whereas median filters tend to preserve the sharp driveline edge transitions while rejecting impulsive inputs (e.g., misfire acceleration behavior) but are more influenced by nonimpulsive variations.

What is needed is an improved approach for misfire detection particularly one that is insensitive to adverse powertrain operating effects. In particular, an improved system needs to account for mechanically induced vibrations on the engine's crankshaft, and driveline perturbations over a wide range of engine operating conditions. The improved technique ideally would reject both impulsive and nonimpulsive acceleration behavior to allow the underlying driveline vibration signal to be extracted from the incoming acceleration signal with high fidelity. This improved technique also needs to improve acceleration signal fidelity by improving the acceleration signal's signal-noise ratio and separation factor in order to accurately detect misfire.

BRIEF DESCRIPTION OF THE DRAWINGS

FIGS. 5a, 5b, and 5c are flow charts illustrating a preferred method in accordance with the invention;

DETAILED DESCRIPTION OF A PREFERRED EMBODIMENT

A modified trimmed mean filtering method and apparatus for a misfire detection includes acquiring a fixed length time-continuous series of acceleration data samples representative of acceleration behavior of a reciprocating engine. And, providing a filtered acceleration data sample dependent on an average acceleration magnitude of a portion of the acceleration data samples bounded within a range of amplitudes and a time-centered acceleration data sample of the acquired fixed length time-continuous series of acceleration data samples. A misfire condition can be indicated dependent on a magnitude of the filtered acceleration data sample.

The new method/apparatus performs better than contemporary median filter based misfire detection approaches because it allows an increase in signal-noise ratio and separation factor for any given acceleration data sample window size by applying an either prelearned or an adaptive parameter.

Figure 1:
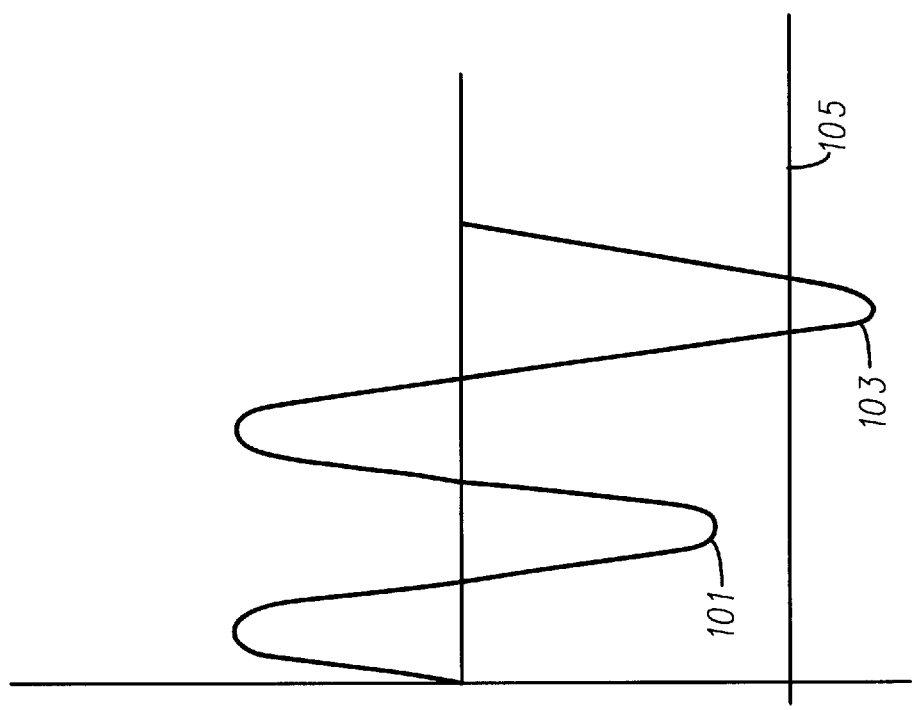
FIG. 1 is a chart showing a theoretical acceleration waveform representing engine torque and illustrates the behavior of proper firing and misfiring.
Figure 2:
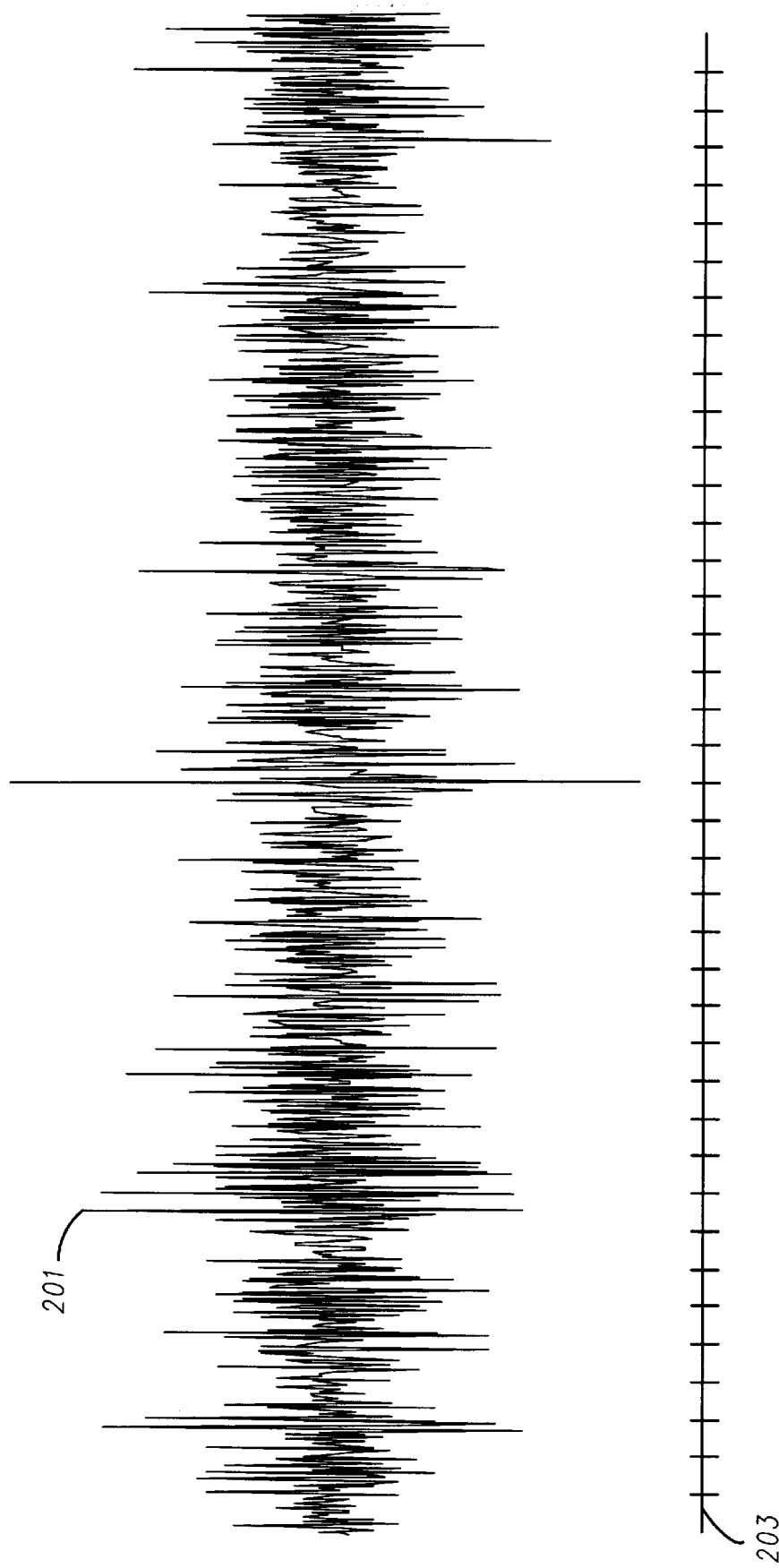
FIG. 2 is a chart showing an engine acceleration waveform from an actual engine running at 5,000 RPM under a light load illustrating effects of high frequency noise due to crankshaft torsional vibrations, inertial torque due to reciprocating masses, other mechanically induced vibrations on the engine's crankshaft, and driveline perturbations.
Figure 3:
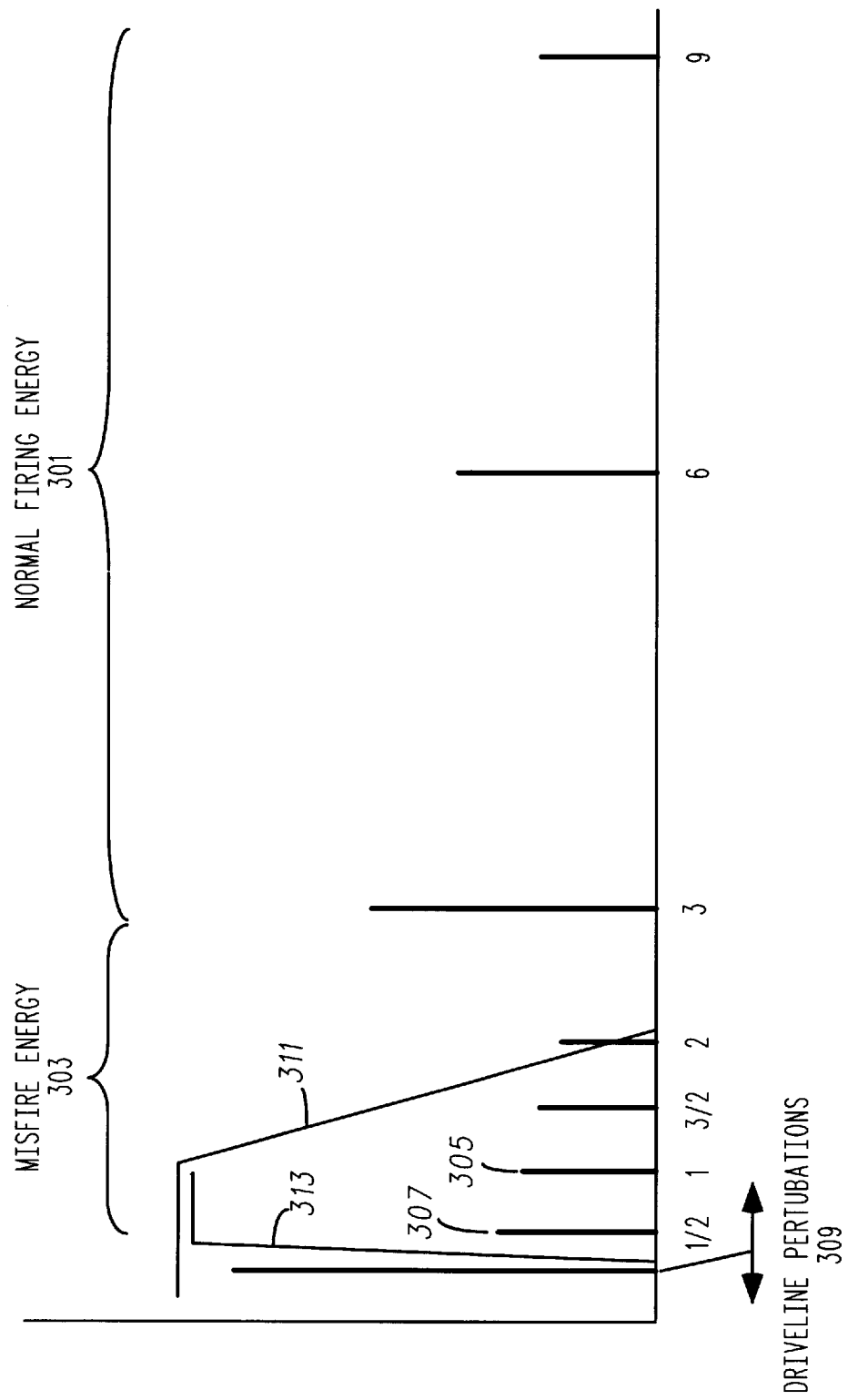
FIG. 3 is a chart illustrating various spectral behavior characteristic of engine acceleration due to normal combustion torque, torque due to reciprocating masses, misfiring, torsional vibrations, high-order subpartials, and driveline vibrations for a 6 cylinder 4-stroke reciprocating engine in terms of engine cycles/revolution.

FIGS. 1 and 2 were introduced in the Background section. FIG. 3 is a chart illustrating various spectral behavior characteristic of engine acceleration due to normal combustion torque, torque due to reciprocating masses, misfiring, torsional vibrations, high-order subpartials, and driveline vibrations for a 6 cylinder 4-stroke reciprocating engine in terms of engine cycles/revolution. Normal combustion firing torque (measured here as energy), and torque due to reciprocating masses 301 manifests itself at 3, 6, and 9 cycles/revolution. Misfire induced energy 303 includes energy indicative of a coil-pack failure at 1 cycle/revolution 305 (since 3 of 6 cylinders normally fires/revolution), and a hard failure of one cylinder at ½ cycle/revolution 307 (since each cylinder normally fires every 2 revolutions). Driveline vibrations 309, at least partially caused by cylinder misfiring, torque converter lockup, low speed lugging behavior characteristic of a manual transmission, a change in transmission gears and rough road conditions, occur at a characteristically low order, are relatively strong in magnitude, shift around in order, and are positioned precariously proximate the energy associated with misfire.

In particular it is the first order (1 cycle/revolution) and half-order (½ cycle/revolution) behavior that is precariously proximate the order of the driveline vibrations that make it difficult at best to determine a misfiring condition in a reciprocating engine. Furthermore, through experimentation, it has been found that the behavior of these closely proximate sources of behavior varies significantly in order due to driveline vibrations and magnitude due to driveline vibrations and various engine operating conditions including engine speed, engine load, and engine-transmission coupling compliancy. To improve the fidelity of the acceleration waveform shown in FIG. 2, a system and corresponding method will be detailed below.

Figure 4:
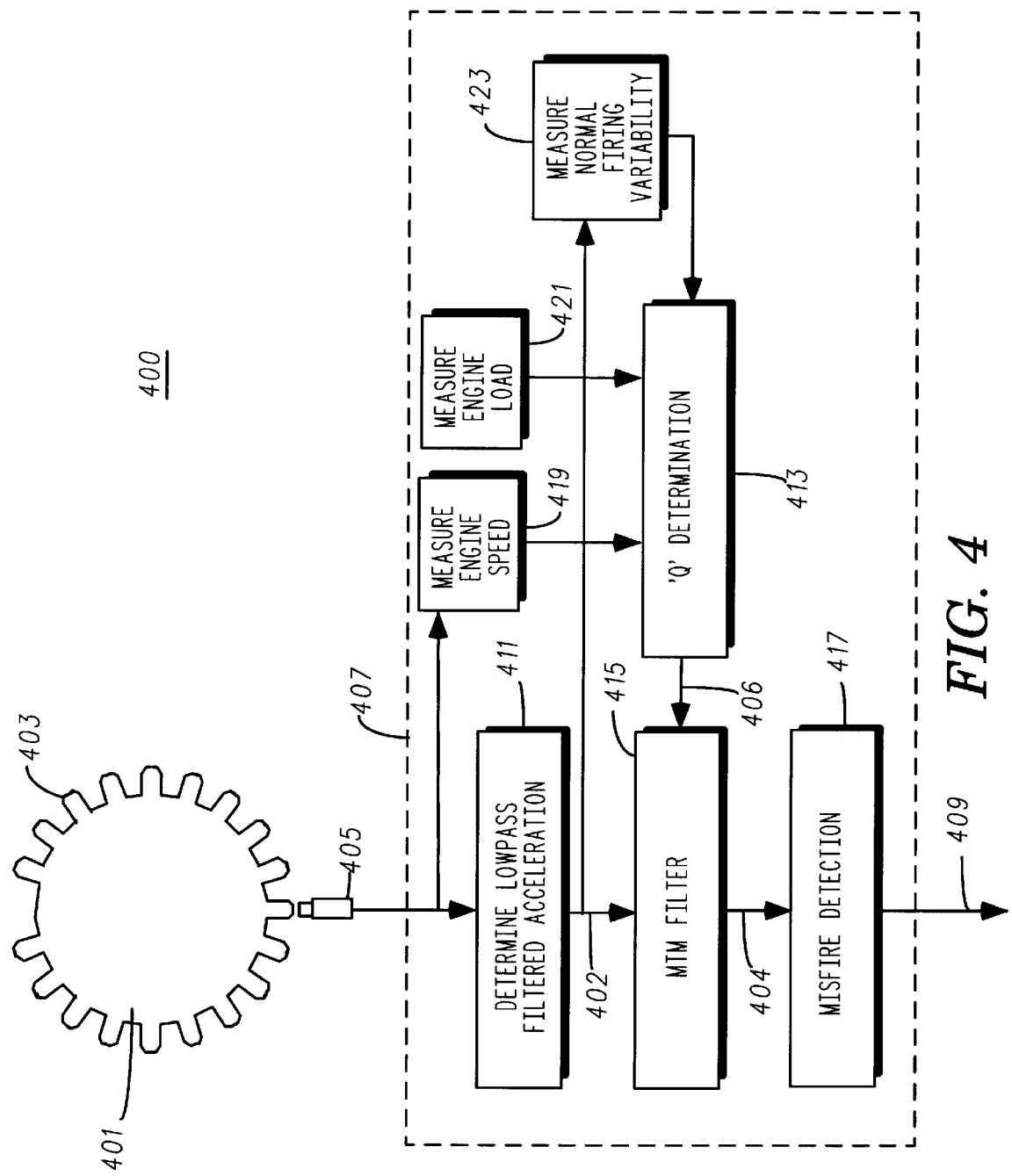
FIG. 4 is a system block diagram in accordance with a preferred embodiment of the invention.

In FIG. 4, a system block diagram illustrates a misfire detection system 400. This system 400 is used to detect a misfiring condition using engine acceleration as a metric of combustion performance. Furthermore, it has the capability of significantly improving measured acceleration signal fidelity through a structure including a programmable filter 415 that filters out adverse effects of, extraneous engine vibrations and driveline vibrations. Preferably, this filter 415 is a programmable digital filter programmed through apriori engine characterization and/or adaptively as the engine runs. A wheel 401 has teeth, or positional markers 403 disposed radially on an edge of the wheel 401. The wheel 401 is coupled to a crankshaft of the engine and rotates as the crankshaft rotates. An encoder, or position sensor, 405 is positioned across from the wheel 401 and is used to sense position of the teeth 403 as the wheel 401 rotates driven by the engine's combustion process. A misfire determination system 407 interprets an output of the encoder 405 and provides a signal 409 indicative of misfire behavior when it is detected.

Note that the system 400 is a sampled data system but could be implemented in a time-continuous domain if desirable. A first signal processing block 411 continuously determines an acceleration of the wheel 401 and provides an acceleration signal 402. Moreover, the first signal processing block 411 preferably includes a lowpass filter to filter out normal combustion energy associated with spectral behavior above the order of the misfiring data. A graphical representation of the preferred lowpass filter's response is shown in FIG. 3 at reference number 311.

Another system block 413 determines a range variable or 'Q' factor can be derived (speed/load) from engine characterization data and/or adaptively as the engine runs. System blocks 419, 421 and 423 measure engine speed, engine load, and normal firing variability respectively all of which can be used to determine an optimal range factor for an MTM filter described below. Preferably both apriori-determined engine characterization data and adaptively measured engine data is used to determine 'Q'. The range variable or 'Q' is provided at reference number 406.

The lowpass filtered acceleration signal 402 is then processed by a modified trim mean (MTM) filter in system block 415 to in accordance with the range variable or 'Q' factor 406 to produce a filtered acceleration signal 404 substantially absent any energy associated with driveline vibrations previously shown at reference number 309 in FIG. 3. Essentially, the MTM filter acts as a non-linear highpass filter. A graphical estimation of the MTM filter's spectral response is shown in FIG. 3 at reference number 313. Since the driveline perturbations move around in terms of order under differing engine operating conditions (engine speed, engine load, normal firing variability, etc.), the MTM filter 415 is modified using the range variable 406.

The filtered acceleration signal 404 is then provided to a misfire detection block 417 and the earlier-described signal 409 is provided to indicate a misfire condition if it occurs. Now that the system block diagram has been introduced the preferred method will be detailed.

FIGS. 5a, 5b, and 5c are flow charts illustrating the preferred method or routines 500. Preferably, this method is executed on a microcontroller embodied within the misfire determination system 407. The routines 500 include three separate process or software modules shown in FIGS. 5a, 5b, and 5c. In a first module shown in FIG. 5a 501, the microcontroller continuously acquires a fixed length time-continuous series of 'n' acceleration data samples using the system hardware introduced in FIG. 4. The number of samples continuously acquired defines a rank, or order, of the described MTM filter. In the example described here, there are 29 samples acquired, so 'n' (and also the MTM filter's rank) is equal to 29. Different filter ranks can be used dependent on various engine operating conditions. Step 501 also includes a lowpass filter for filtering the acquired acceleration values as first noted in system block diagram 400 in block 411.

Next in FIG. 5b, at step 503 a range factor 'Q' is determined. The step 503 emulates the system block 413 from FIG. 4. This process 503 is also a continuous process. Details of how the range factor 'Q' is determined will be described later in FIG. 7.

In FIG. 5c, the steps 505 therefor to 515 represent method steps emulating the MTM filter shown in FIG. 4 at reference number 415. The MTM filter portion of the routine 500 commences at a start step 505. At a next step 507, an acceleration data sample of the 'n' acceleration data samples continuously acquired in step 501, that has a magnitude median within the 'n' acceleration data samples is determined.

In the next step 509, a current range factor 'Q' is fetched from the routine 503. Then in step 511, one or more acceleration data samples 'x' within the sample window (29 samples) are selected based on the following criteria.

(median–'Q')<'x'<(median+'Q')

Then in step 513, the acceleration data samples that were selected in step 511 are averaged.

In step 515, a filtered acceleration data sample is determined using the average of the acceleration data samples falling within the range defined in step 511, and one of the 'n' acceleration data samples that were continuously acquired in step 501. Preferably, a time-centered acceleration data sample is subtracted from the average acceleration data sample determined in step 513.

An example of actual data is illustrated below in chart form. The acceleration data samples were acquired from a 6 cylinder 4-stroke reciprocating engine.

CHART 1

Chart 1

| SAMPLE NUMBER | ACCELERATION |
|---|---|
| 1 | −1.0671 |
| 2 | −0.6579 |
| 3 | −0.1037 |
| 4 | 0.4599 |
| 5 | 0.919 |
| 6 | 1.169 |
| 7 | 1.2091 |
| 8 | 1.064 |
| 9 | 0.8111 |
| 10 | 0.5084 |
| 11 | 0.195 |
| 12 | −0.2236 |
| 13 | −0.8127 |
| 14 | −1.628 |
| 15 | −2.5846 |
| 16 | −3.5733 |
| 17 | −4.3497 |
| 18 | −4.7232 |
| 19 | −4.5257 |
| 20 | −3.7294 |
| 21 | −2.4191 |

Chart 1-continued

| SAMPLE NUMBER | ACCELERATION |
|---|---|
| 22 | −0.8397 |
| 23 | 0.7467 |
| 24 | 2.0074 |
| 25 | 2.7802 |
| 26 | 2.9494 |
| 27 | 2.6294 |
| 28 | 1.9442 |
| 29 | 1.1657 |

Figure 6:
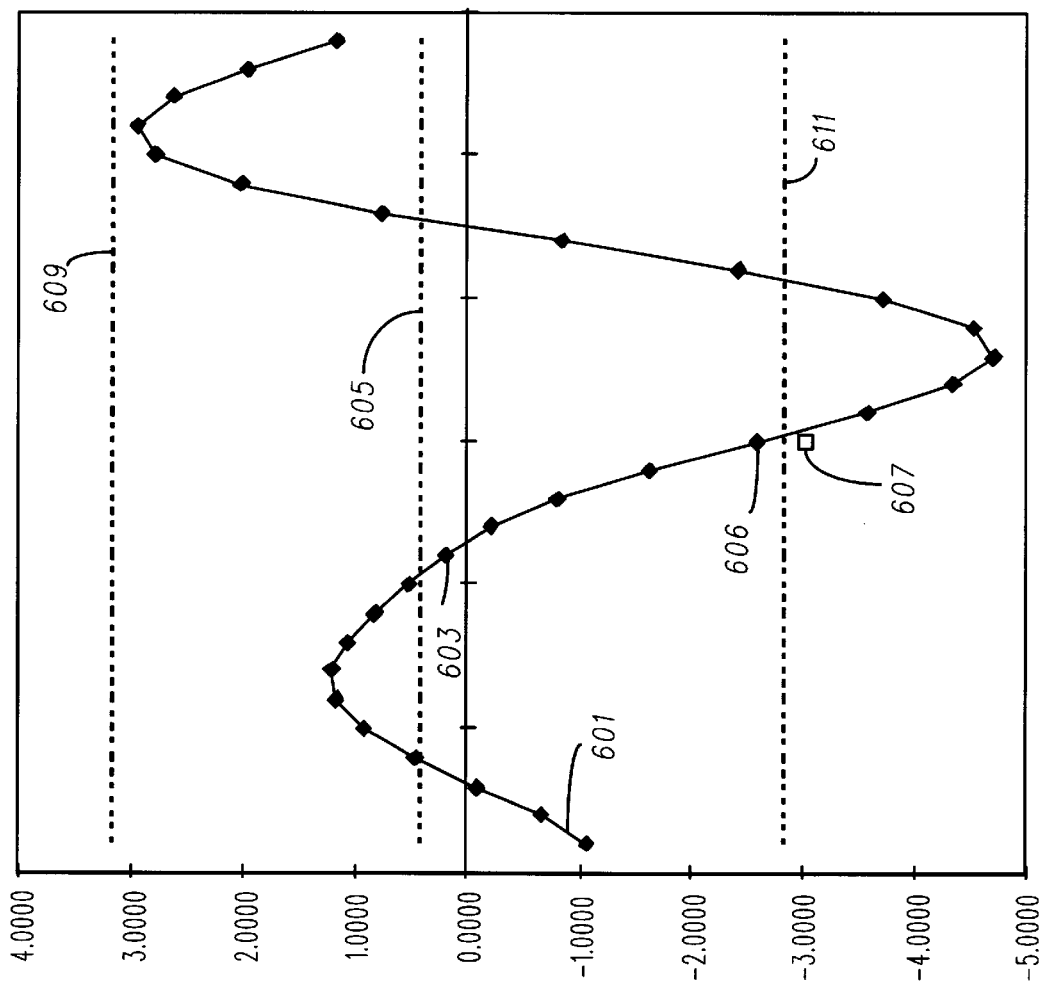
FIG. 6 is a graph illustrating a example of a computation of the modified trimmed mean value for an actual window of acceleration (window width=29) values taken from a 6 cylinder 4-stroke reciprocating engine.

FIG. 6 shows the above-introduced data in graphical form. The continuously acquired acceleration data samples 601 are plotted by their relative magnitude and time relationships.

Returning to step 507, an acceleration data sample that has a magnitude median within the 'n' acceleration data samples is determined. For the presented data, sample 11(0.1950) is the median acceleration data sample. This median acceleration data sample is shown in FIG. 6 at reference number 603. Note that the median acceleration data sample may be either a computed value or one of the actual data samples most proximate a computed median.

Next, in step 507 a range factor 'Q' is fetched from the routine 503. Here the fetched range factor is 3. From the fetched 'Q' and the determined median range boundaries can be determined to be (0.1950+3) 609, and (0.1950−3) 611. Now, in step 511 all of the acceleration data samples that fall within the range boundaries 609 and 611, bounded surrounding the determined median acceleration data sample (sample 11), are gathered. Those acceleration data samples that qualify include acceleration data samples 1–15, and 21–29.

Next, in step 513 the selected acceleration data samples 1–15, and 21–29 are averaged to provide an average acceleration magnitude (MTM value). Here the determined average acceleration magnitude is (0.4259). This determined average acceleration magnitude is shown in FIG. 6 at reference number 605.

Then, in step 515 a filtered acceleration data sample is determined based on subtracting the MTM value from the time-centered acceleration data sample. The time-centered acceleration data sample is shown in FIG. 6 at reference number 606. The resulting filtered acceleration data sample has a magnitude of −2.5846−0.4259 or −3.0105. This filtered acceleration data sample is shown in FIG. 6 at reference number 607.

Figure 7:
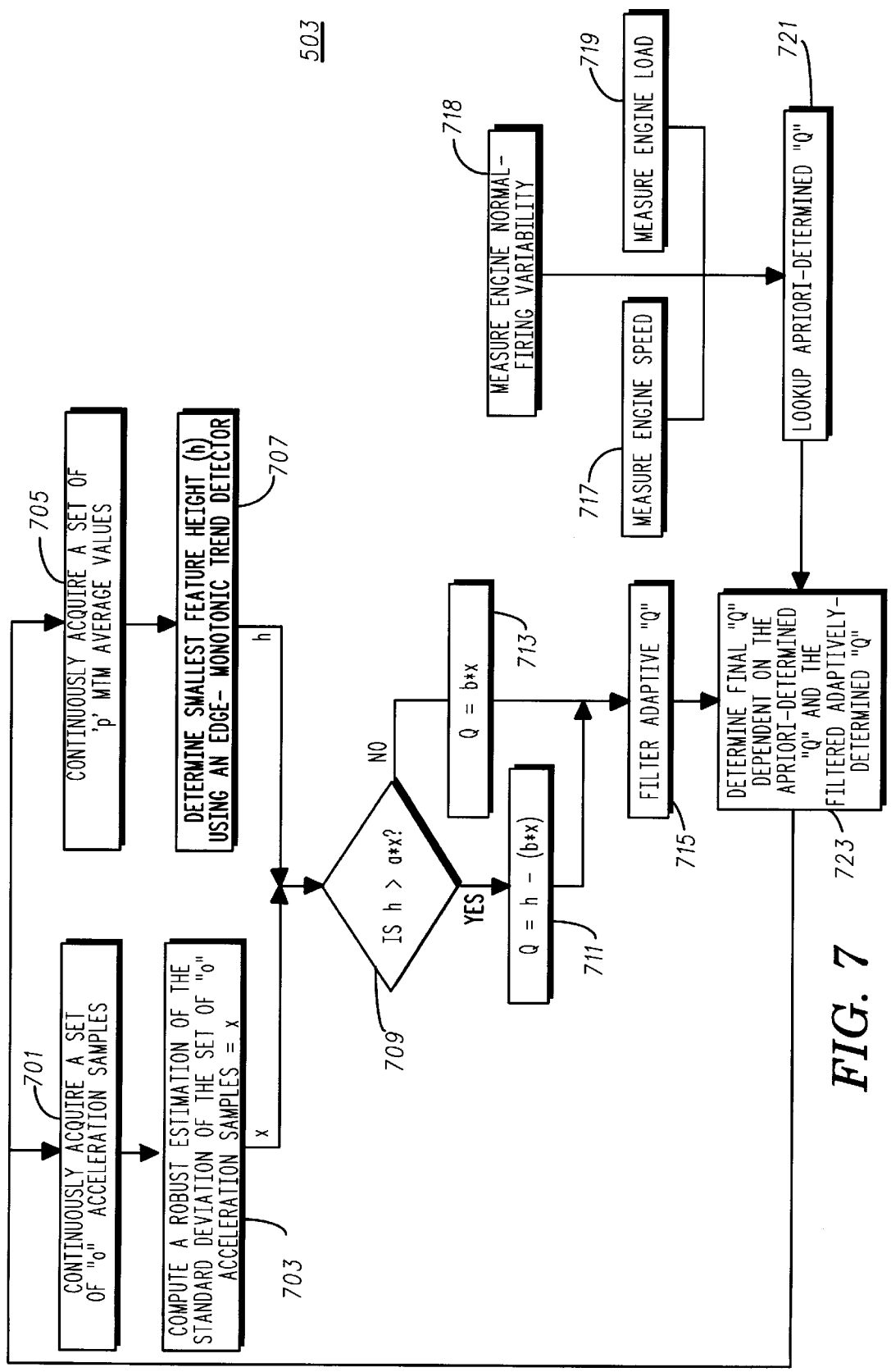
FIG. 7 is a flow chart illustrating details of determining a 'Q' factor for a modified trim mean (MTM) filter in accordance with the preferred embodiment of the invention.

Next, the determination of the range factor 'Q' will be detailed. FIG. 7 is a flow chart illustrating details of determining a 'Q' factor for a modified trim mean (MTM) filter. Essentially, FIG. 7 expands the routine 503 introduced in FIG. 5. The routine 503 consists essentially of two general routines; the dynamic (or adaptive) determination of 'Q', and the look-up of a static (or apriori-determined) 'Q'. First, the dynamic (or adaptive) determination of 'Q' will be detailed.

The driveline resonant signal, also called the root signal in some of the literature, could be thought of as a series of constant levels connected by monotonic runs. The goal of the MTM filter is to detect and retain the fidelity of this underlying 'root signal' while rejecting other nonimpulsive and impulsive inputs. After the root driveline resonant effects have been obtained they can be removed from the input acceleration signal. A knowledge, adaptively or apriori, of 1) the level of noise riding on the root signal and 2) the overall magnitude of the root signal's edge heights (i.e. the magnitude of the monotonic jumps from one level to the next) is needed to properly define the level of 'Q' to incorporate at any given point in time (i.e., 'Q' is a function of noise levels and root signal magnitudes). In step 701, a set of 'o' acceleration data samples are continuously acquired. A number of acceleration data samples in the set 'o' may be identical or different from the 'n' acceleration data samples acquired in step 501 of routine 500 shown in FIG. 5.

In step 703, a robust estimation of the standard deviation 'x' of the set of 'o' acceleration data samples is computed. Many different techniques can be used to compute an estimation, here essentially any far-out-of-bounds, or outlying, data is eliminated before the standard deviation is calculated. This step is used to estimate the level of noise on the root signal. Concurrently in step 705, another set of 'p' MTM average values are acquired. Then in step 707, a edge height 'h' is determined, preferably using a edge-monotonic trend detector. The edge height 'h' essentially identifies the minimum magnitude of level jumps needed to be retained, for an existing driveline resonant condition, for later filtering from the input acceleration data. So, 'h' is a measure of the magnitude of the underlying driveline ringing content of the acceleration data.

In step 709, a test is made to see whether or not 'h', is greater than a product of 'a' (a constant) and 'x' the determined robust estimation of the standard deviation of the set of 'o' acceleration data samples. If it is, then in step 711 the range factor 'Q' is set equal to a difference between 'h' and a product of 'b' (a constant) and 'x' the robust estimation of the standard deviation of the set of 'o' acceleration data samples determined in step 703.

If the product of 'a' and 'x' is not greater than 'h', then step 713 is executed. In step 713, the range factor 'Q' is set to a value dependent of a product of 'b' (a constant) and 'x' the robust estimation of the standard deviation of the set of 'o' acceleration data samples.

Then in step 715, the adaptive 'Q' is filtered to smooth out any anomalies.

Next, the static (or apriori-determined) 'Q' derivation will be detailed. In step 717, engine speed is measured using the apparatus introduced in FIG. 4. In step 718, engine normal-firing variability is measured. The normal-firing variability can be measured in terms of acceleration by interpreting the acceleration data samples and is essentially represents the relatively long-term variance of the engine's firing behavior. Also, in step 719, engine load is measured preferably by measuring mass air flow of the engine, or alternatively by combining a measurement of manifold absolute pressure and engine speed derived from step 717. Either one or all of the measured engine speed, normal-firing variability, and measured engine load is used to look up an apriori-determined 'Q' in step 721.

In step 723, a final 'Q', or range variable, is determined dependent on either or both of the apriori-determined 'Q' and the filtered adaptively-determined 'Q'. It is this finally determined 'Q' that is applied in earlier described step 509.

Before presenting the results of applying the above-described approach, a definition of separation factor and signal-noise ratio will be detailed next.

As mentioned in the Background there are two metrics that are important in a misfire detection mechanism; namely separation factor and signal-noise ratio. Separation Factor is a metric used to define a difference between two populations. In the application described here the two populations represent 1) magnitude variations based on normal firing events and 2) magnitude variations based on misfiring events. The separation factor encompasses a measure of a population's central tendencies, and a population's variation. The separation factor is computed as follows:

EQUATION 1

$$\text{separation factor} = |\text{mean(firing values)} - \text{mean(misfiring values)}| \div (\sigma(\text{firing values}) + \sigma(\text{misfiring values}))$$

Signal-noise ratio is a metric based on the maximum and minimum magnitude values of firing and misfiring events. The (worst-case) signal-noise ratio is computed as follows:

EQUATION 2

$$\text{worst-case signal-noise ratio} = (\text{maximum(misfiring values)}) \div (\text{minimum(firing values)})$$

Now that the system, method steps, and definition of separation factor and signal-noise ratio have been introduced, an example of before-and-after data will help illustrate the resulting benefit of applying the described approach.

Figure 8:
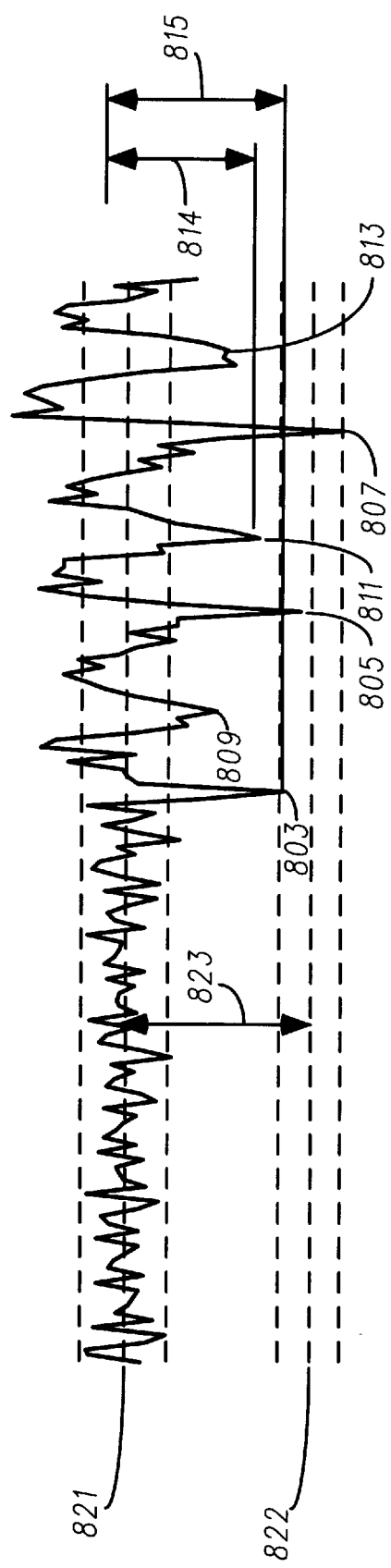
FIG. 8 is a graph showing both signal-noise ratio and separation factor of acceleration data unprocessed by the inventive structure.
Figure 9:
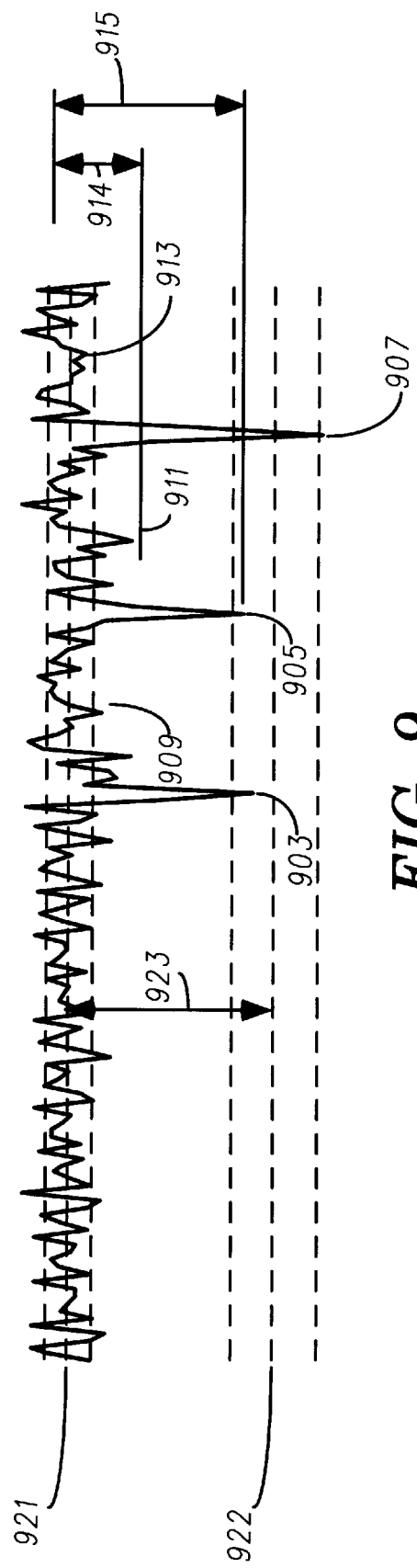
FIG. 9 is a graph showing both an improved signal-noise ratio and an improved separation factor of the same acceleration data that has been processed through the inventive structure.

FIG. 8 is a graph showing both signal-noise ratio and separation factor of acceleration data unprocessed by the inventive structure, and FIG. 9 is a graph showing both an improved signal-noise ratio and an improved separation factor of the same acceleration data that has been processed through the inventive structure.

Reference numbers 821, and 921 show the arithmetic means of the normal-firing population, bounded by their respective ±1 standard deviation lines. Reference numbers 822 and 922 show the arithmetic means of the misfiring population, bounded by their respective ±1 standard deviation lines.

The dashed lines represent a measure of the variation during a particular operating condition (i.e., firing or misfiring). Features 823 and 923 represent the mean distance between the firing and misfiring populations.

Features 803, 805, and 807 represent the acceleration signal due to engine misfire before the application of the inventive structure. Features 903, 905, and 907 represent the acceleration signal due to misfire after the inventive structure is applied.

Features 809, 811, and 813 represent the driveline resonant effects on the acceleration signal before the inventive structure is applied. Features 909, 911 and 913 represent the reduction of driveline resonant effects after the inventive structure is applied.

Features 814, 815, 914 and 915 graphically display the worst-case signal-noise ratio. The ratios of 815 to 814 and 915 to 914 represent the worst-case signal-noise ratios before and after the inventive structure is applied.

The overall goal of the inventive structure is to maximize the separation factor and the signal-noise ratio. This requires, ideally, that the population variations approach zero while the mean distance between the populations approach infinity.

The separation factor and the signal-noise ratio of the acceleration data in FIG. 8 are 2.5 and 1.2 respectively. The separation factor and the signal-noise ratio of the acceleration data in FIG. 9 are 3.1 and 2.4 respectively. The results show a significant improvement in both separation factor and signal-noise ratio. This improvement enables more accurate misfire detection over a broader range of engine operating conditions as mandated by current legislation.

In summary, by applying the above-described approach a significant improvement in the fidelity (as measured in terms of both separation factor and signal-noise ratio) of the signal representative of the engine acceleration can be achieved. This includes improving signal fidelity over a wide dynamic range according to engine and driveline related variable magnitude, duration, and frequency vibrations. Because of this improvement, engine misfires can be detected over a much broader range of vehicular operating conditions than prior art systems, including detection of misfires while the driveline is ringing—stimulated by misfires.

What is claimed is:

1. A modified trimmed mean filtering method for a misfire detection system for a reciprocating engine comprising the steps of:
   acquiring a fixed length time-continuous series of acceleration data samples representative of acceleration behavior of the reciprocating engine;
   providing a filtered acceleration data sample dependent on an average acceleration magnitude of a portion of the acceleration data samples bounded within a range of amplitudes and a singular acceleration data sample of the fixed length time-continuous series of acceleration data samples;
   measuring engine speed;
   wherein a magnitude of the range of amplitudes is determined dependent on the engine speed; and
   indicating a misfire condition dependent on a magnitude of the filtered acceleration data sample.

2. A method in accordance with claim 1 further comprising a step of:
   measuring engine load; and
   wherein a magnitude of the range of amplitudes is determined dependent on the engine load.

3. A method in accordance with claim 1 further comprising a step of:
   measuring normal firing acceleration variability; and
   wherein a magnitude of the range of amplitudes is determined dependent on the normal firing acceleration variability.

4. A method in accordance with claim 1 wherein the step of determining a filtered acceleration data sample comprises a step of determining the filtered acceleration data sample by subtracting the average acceleration magnitude from the singular acceleration data sample and provides the filtered acceleration data sample dependent thereon.

5. A method in accordance with claim 1 wherein the singular acceleration data sample is a time-centered acceleration data sample of the fixed length time-continuous series of acceleration data samples.

6. A method in accordance with claim 1 wherein the singular acceleration data sample is amplitude proximate an amplitude of a time-centered acceleration data sample of the fixed length time-continuous series of acceleration data samples.

7. A modified trimmed mean filtering method for a misfire detection system for a reciprocating engine comprising the steps of:
   acquiring a fixed length time-continuous series of acceleration data samples representative of acceleration behavior of the reciprocating engine;
   determining a median acceleration data sample that has a magnitude median within the fixed length time-continuous series of acceleration data samples;
   measuring engine speed determining a range variable dependent on the engine speed;
   selecting a plurality of acceleration data samples from the fixed length time-continuous series of acceleration data samples that have magnitudes bounded within a range of median acceleration data sample minus the range variable and the median acceleration data sample plus the range variable;
   providing an average acceleration magnitude dependent on an average magnitude of the selected plurality of acceleration data samples;
   determining a filtered acceleration sample dependent on the average acceleration magnitude and a time-centered acceleration data sample of the fixed length time-continuous series of acceleration data samples; and
   indicating a misfire condition dependent on a magnitude of the filtered acceleration data sample.

8. A method in accordance with claim 7 further comprising a step of: measuring engine load; and wherein the range variable is determined dependent on the engine load.

9. A method in accordance with claim 7 further comprising a step of: measuring normal firing acceleration variability; and wherein the range variable is determined dependent on the normal firing acceleration variability.

10. A method in accordance with claim 7 wherein the step of determining a filtered acceleration data sample comprises a step of determining the filtered acceleration data sample by subtracting the average acceleration magnitude from a time-centered acceleration data sample and provides the filtered acceleration data sample dependent thereon.

11. A modified trimmed mean filtering apparatus for a misfire detection system for a reciprocating engine comprises:
   acceleration measurement means for acquiring a fixed length time-continuous series of acceleration data samples representative of acceleration behavior of the reciprocating engine;
   means for measuring an operating condition of the reciprocating engine;
   means for determining a median acceleration data sample that has a magnitude median within the fixed length time-continuous series of acceleration data samples;
   means for determining a range variable dependent on the operating condition of the reciprocating engine;
   means for selecting a plurality of acceleration data samples from the fixed length time-continuous series of acceleration data samples that have magnitudes bounded within a range of median acceleration data sample minus the range variable and the median acceleration data sample plus the range variable;
   means for providing an average acceleration magnitude dependent on an average magnitude of the selected plurality of acceleration data samples;
   means for determining a filtered acceleration data sample dependent on the average acceleration magnitude and a time-centered acceleration data sample of the fixed length time-continuous series of acceleration data samples; and
   a device for indicating a misfire condition dependent on a magnitude of the filtered acceleration data sample.

12. An apparatus in accordance with claim 11 wherein the means for measuring an operating condition of the reciprocating engine comprises a device for measuring engine speed; and
   wherein the range variable is determined dependent on the engine speed.

13. An apparatus in accordance with claim 11 wherein the means for measuring an operating condition of the reciprocating engine comprises a device for measuring engine load; and wherein the range variable is determined dependent on the engine load.

14. An apparatus in accordance with claim 11 wherein the means for measuring an operating condition of the reciprocating engine comprises a device for measuring engine normal firing variability; and wherein the range variable is determined dependent on the engine normal firing variability.

15. An apparatus in accordance with claim 11 wherein the means for determining a filtered acceleration data sample comprises a means for determining the filtered acceleration data sample by subtracting the average acceleration magnitude from the time-centered acceleration data sample and provides the filtered acceleration data sample dependent thereon.

16. An apparatus in accordance with claim 11 further comprising a means for indicating a misfire condition dependent on a magnitude of the filtered acceleration data sample.

* * * * *